(12) United States Patent
Hong et al.

(10) Patent No.: US 7,848,051 B2
(45) Date of Patent: Dec. 7, 2010

(54) INTERNAL DISC DRIVE FILTER ASSEMBLY

(75) Inventors: Yiren Hong, Singapore (SG); Yichao Ma, Singapore (SG); KokWah Tan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 745 days.

(21) Appl. No.: 11/776,214

(22) Filed: Jul. 11, 2007

(65) Prior Publication Data

US 2009/0015964 A1 Jan. 15, 2009

(51) Int. Cl.
*G11B 33/14* (2006.01)
(52) U.S. Cl. .................................... 360/97.02
(58) Field of Classification Search ............... 360/97.02, 360/97.03, 97.01, 98.01
See application file for complete search history.

(56) References Cited

U.S. PATENT DOCUMENTS

| 4,888,655 | A | 12/1989 | Bonn | |
|---|---|---|---|---|
| 6,594,108 | B2 * | 7/2003 | Naganathan et al. | 360/97.02 |
| 6,709,498 | B2 | 3/2004 | Tuma | |
| 6,898,048 | B2 * | 5/2005 | Adams et al. | 360/97.02 |
| 6,940,687 | B2 | 9/2005 | Hong et al. | |
| 6,999,273 | B2 | 2/2006 | Tsang et al. | |
| 7,019,941 | B2 | 3/2006 | Yoo | |
| 7,529,062 | B2 * | 5/2009 | Xu | 360/97.02 |

FOREIGN PATENT DOCUMENTS

JP 2-172086 A * 7/1990

* cited by examiner

*Primary Examiner*—Jefferson Evans
(74) *Attorney, Agent, or Firm*—H. Sanders Gwin, Jr.

(57) ABSTRACT

An assembly comprises a housing and a rotatable data disc within the housing. The rotatable data disc creates a gas flow within the housing when the rotatable data disc rotates. The assembly further comprises a filter at a perimeter position of the rotatable data disc positioned to capture a portion of the gas flow, a first support element fixed relative to the housing and adjacent an upstream side of the filter, wherein the portion of the gas flow circumscribes the first support element and a second support element fixed to the housing and adjacent a downstream side of the filter, wherein the portion of the gas flow also circumscribes the second support element.

20 Claims, 6 Drawing Sheets

INTERNAL DISC DRIVE FILTER ASSEMBLY

TECHNICAL FIELD

The invention relates to gas filtration within disc drives.

BACKGROUND

A hard disc drive (HDD) generally includes a rigid housing containing a variety of disc drive components including one or more data storage discs. One or more data storage discs are mounted on a spindle motor that that spins the discs to allow read/write heads to access the data surfaces of the discs.

A HDD may contain a gas filtration system to filter particles from gas flow within the housing caused by the rotating data storage disc(s). Filtering particles from the gas flow may increase the reliability of a disc drive.

SUMMARY

An assembly comprises a housing and a rotatable data disc within the housing. The rotatable data disc creates a gas flow within the housing when the rotatable data disc rotates. The assembly further comprises a filter at a perimeter position of the rotatable data disc positioned to capture a portion of the gas flow, a first support element fixed relative to the housing and adjacent an upstream side of the filter, wherein the portion of the gas flow circumscribes the first support element and a second support element fixed to the housing and adjacent a downstream side of the filter, wherein the portion of the gas flow also circumscribes the second support element.

The details of one or more embodiments of the present invention are set forth in the accompanying drawings and the description below. Other features, objects, and advantages of the invention will be apparent from the description and drawings, and from the claims.

DETAILED DESCRIPTION

A recirculation filter system for a disc drive generally includes a recirculation filter within the disc drive housing proximate to the outer perimeter of the one or more data discs in the disc drive. Gas flow within the housing is directed through the filter and the loose particles carried by the gas flow are captured by the filter. Generally, the internal environment of a disc drive consists of air. In some disc drives, the internal environment may include another gas, such as helium. In any case, the gas within the internal environment of a disc drive makes up the gas flow.

As the physical size of disc drives has decreased with advancing technology, so has gas flow velocities within disc drives. A reduced gas flow velocity causes a disc drive recirculation filter system to operate less efficiently. Decreases in the physical size of disc drives requires has also led to reduced recirculation filter sizes, which limits the effective filter area available to filter the gas flow.

In some instances, these small recirculation filters made of lightweight materials can be prone to blow away either during the disc drive manufacture process or during disc drive operation if is a recirculation filter is not adequately secured to the housing. Increasing the size of end supports used to hold a recirculation filter in place within a disc drive housing can limit the problem of small recirculation filters being blow away, but decreases the effective filter area a recirculation filter in a disc drive.

Figure 1:
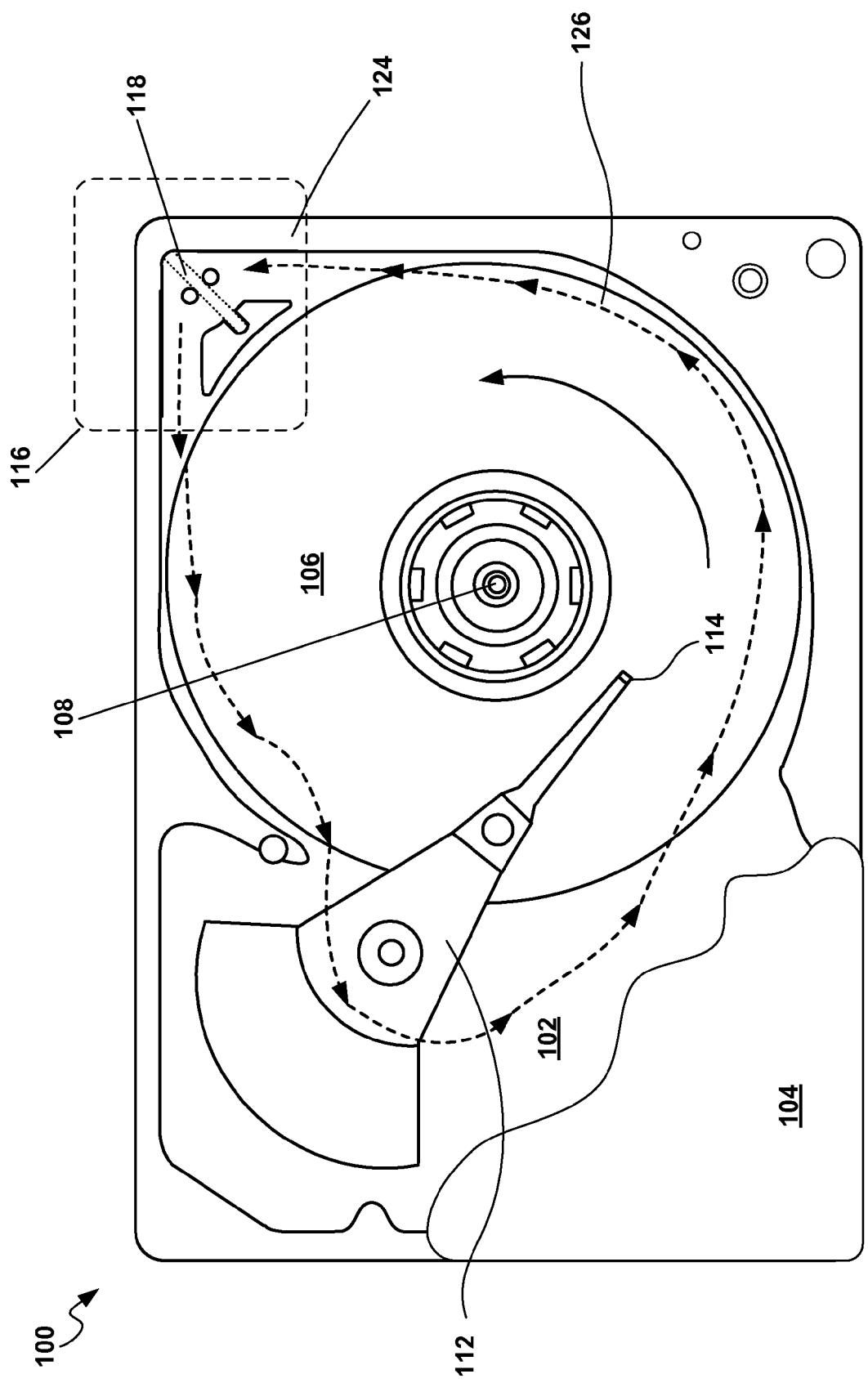
FIG. 1 is an illustration of an exemplary disc drive including a gas flow filter assembly.

FIG. 1 is an illustration of an exemplary disc drive 100 including a gas flow filter assembly 116. Disc drive 100 includes base 102 and a top cover 104, shown partially cut away. Base 102 combines with the top cover 104 to form housing 124, which contains an internal environment of disc drive 100. Disc drive 100 also includes one or more rotatable data discs 106. Actuator arm 112 carries a read/write head 114 for communication with each of the data storage surfaces of data discs 106. Data discs 106 are attached to spindle 108, which operates to rotate discs 106 about a central axis. The rotation of data discs 106 creates gas flow 126 within housing 124.

Loose particles may be present within housing 124 and can damage disc drive 100 if not removed or captured. As shown, disc drive 100 housing contains recirculation filter assembly 116 proximate an outer perimeter of data discs 106, located in a corner of housing 124. Gas flow 126, which is caused by the rotation of data discs 106, is generally sufficient to carry loose particles within housing 124. Filter assembly 116 acts to capture loose particles contained within gas flow 126. A portion of gas flow 126 is captured by recirculation filter 118, which is positioned adjacent to an outer perimeter of data discs 106. Loose particles carried by the portion of gas flow 126 that passes through filter 118 to are captured by filter 118.

Figure 2:
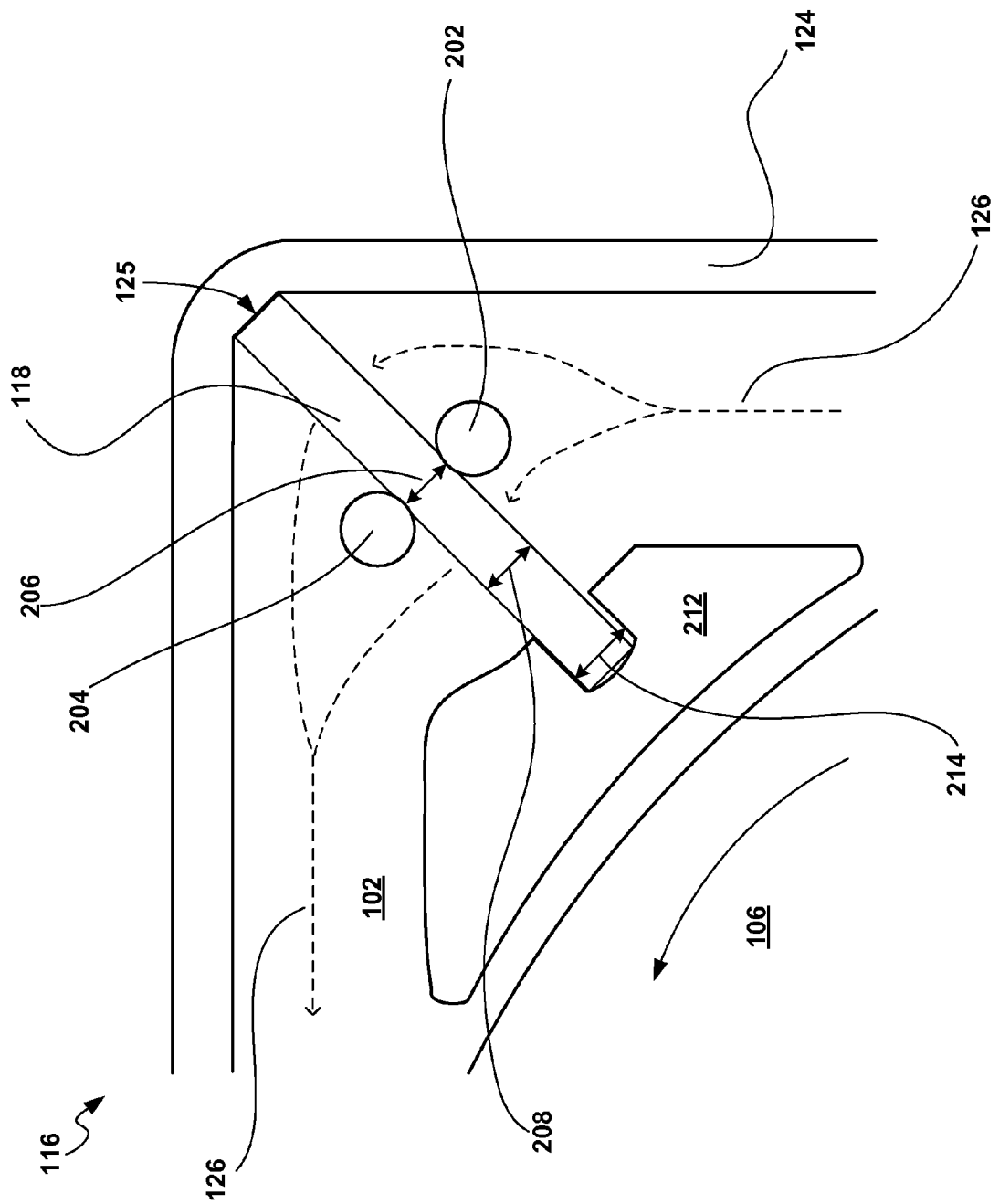
FIG. 2 is an illustration of the filter assembly of the disc drive of FIG. 1.

FIG. 2 is a close-up illustration of filter assembly 116 of disc drive 100 of FIG. 1. As shown, filter assembly 116 includes filter 118, which has a rectangular shape. Filter 118 has a generally perpendicular orientation to the rotational axis of rotatable data discs 106. One end of filter 118 is located a corner of housing 124 and the other end is held by end support 212. Filter 118 extends from the corner of housing 124 to towards the outer perimeter of rotatable data discs 106. Filter 118 is secured by first support element 202 and second support element 204. Relative to gas flow 126, first support element 202 is adjacent to the upstream side of the filter 118, while second support element 204 is adjacent to the downstream side of the filter. First support element 202 and second support element 204 are fixed relative to housing 124 and extend approximately perpendicularly from base 102. First support element 202 and second support element 204 are positioned approximately coincident to one another relative to the portion of gas flow 126 passing through filter 118. The portion of gas flow 126 passing through filter 118 circumscribes both first support element 202 and second support element 204.

Recirculation filter 118 is secured to case 102 by an interference fit between support elements 202 and 204 at gap 206. The interference fit can be created by compressing filter 118 at a portion proximate to the corresponding location of gap 206 and placing the compressed filter into support element gap 206, and then releasing filter 118 from the compression. Filter 118 is elastic and expands from the compressed thickness to its free state thickness 208 except at the area constrained by the bounds of first support element 202 and second support element 204. As a result, filter 118 is held in place by an interference fit between first support element 202 and second support element 204 at gap 206. The frictional force between filter 118, first support element 202 surface and second support element 204 surface secures the recirculation filter 118 to relative to housing 124.

In some embodiments of the invention, gap for interference fit may be 95 percent or less than the free state thickness of the filter. For example, in a one inch disc drive, a gap between first and second support elements may be 0.4 millimeters and the filter may be have a free state thickness of 0.6 millimeters and be capable of being elastically compressed to 0.25 millimeters. Once positioned in the gap, the filter expands to fill the gap at thickness of approximately 0.4 millimeters, such that the filter thickness will be 0.2 millimeters less than the filter's free state thickness of 0.6 millimeters to create an interference fit.

As shown in FIG. 2, one end of filter 118 is constrained by end support 212 that is fixed relative to base 102. The opposing end of filter 118 is in contact with base wall 125. In other embodiments the opposing end of filter 118 may also be secured by an end support similar to end support 212 located adjacent to base wall 125. Slot width 214 of end support 212 is greater than free state thickness 208 of filter 118, which allows for a loose fit between filter 118 and end support 212. A loose fit may make filter installation easier. In other embodiments, filter 118 may have an interference fit with end support 212.

First support element 202, second support element 204 and end support 212 may be made from relative stiff materials. For example, first support element 202, second support element 204 and end support 212 may be made from a metal or from a plastic, such as a polycarbonate and the like.

Figure 3:
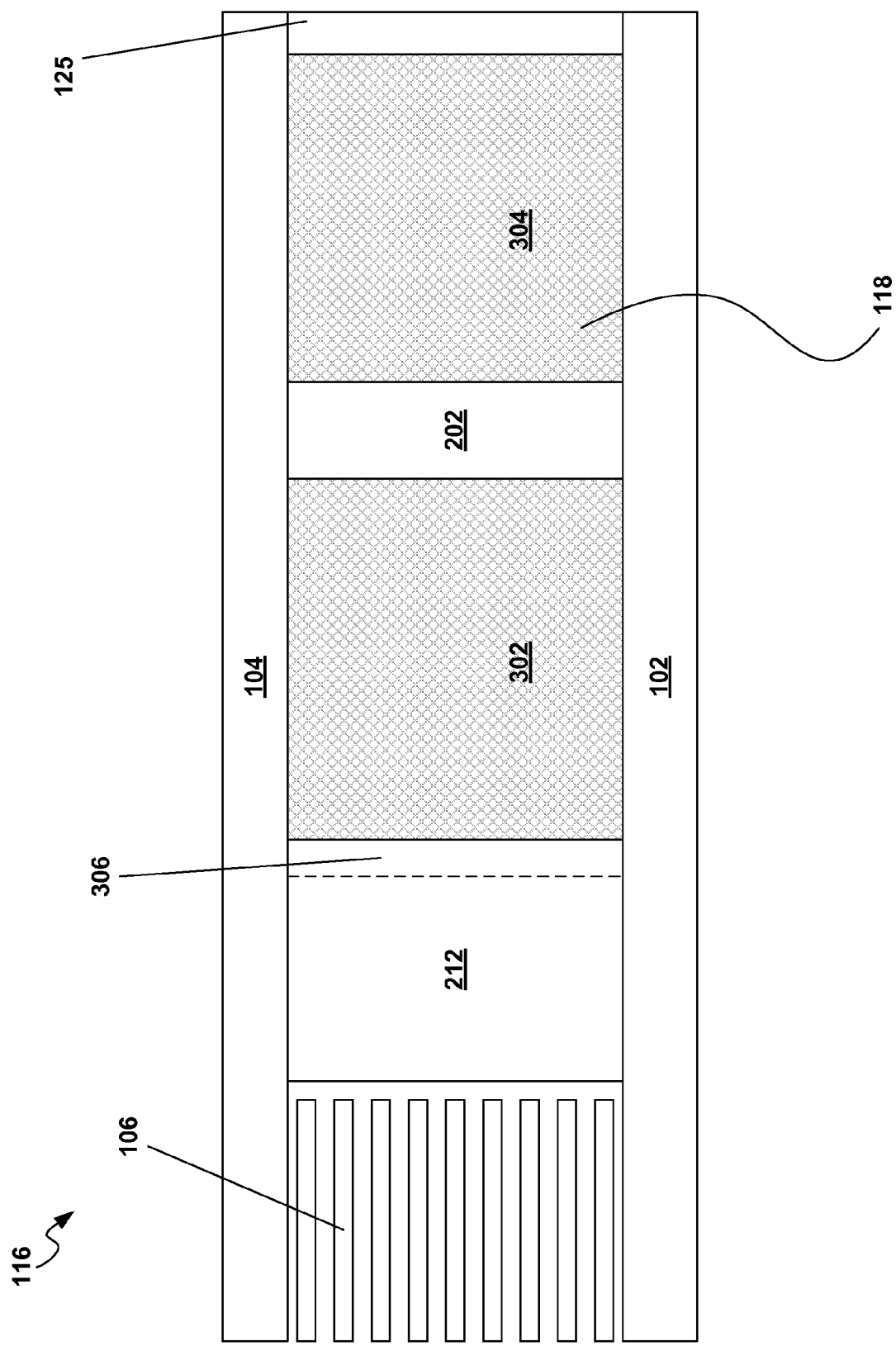
FIG. 3 is a cross sectional view of the filter assembly shown in FIG. 2.

FIG. 3 is a cross sectional view of the filter assembly 116 shown in FIG. 2. As shown, filter assembly 116 is proximate to a stack of nine rotatable data discs 106. Filter 118 is approximately perpendicular to the inner surfaces of base 102 and top cover 104. End support 212, filter 118 and first support element 202, span the entire height between the inner surface of base 102 and the inner surface of top cover 104. In other embodiments according to the present invention, support element 202 and/or end holder 212 may only span a portion of the length from base 102 to top cover 104. Generally, filter 118 should span a substantial majority of the entire height between the inner surface of base 102 and the inner surface of top cover 104 to capture the greatest proportion of gas flow.

Filter 118 is divided by the first support element 202 into effective filter area 302 and effective filter area 304, which represent the total effective filter area of filter 118. Filter 118 is also divided by second support element on the downstream side of filter 118 (not shown in FIG. 3). The portion of filter 118 covered by support element 202 is not included in the effective area of filter 118. Likewise, area 306, which represents the portion of filter 118 inserted into end support 212, is not included in the effective area of filter 118.

Some embodiments of the invention may allow for decreased slot depth of end support, thereby increasing filter efficiency. For example, slot depth may be decreased from 1.5 mm to 1.0 mm in a one inch disc drive. As a further example, slot depth may by decreased from 1.5 mm to 0.5 mm in a one inch disc drive.

In some embodiments, decrease in slot depth may result in increased filter efficiency by increasing total area of filter available for filtration of gas flow. For example, in a one inch disc drive, distance along filter length not available for filtration due to support placement may be decreased from 2.5 millimeters to 1.5 millimeters with a filter with a total length of 4.5 millimeters. Filter efficiency may improve as a result of the increase effective area of a filter. For example, filter efficiency may improve at least 10 percent. For further example, filter may increase 20 to 35 percent.

Figure 4:
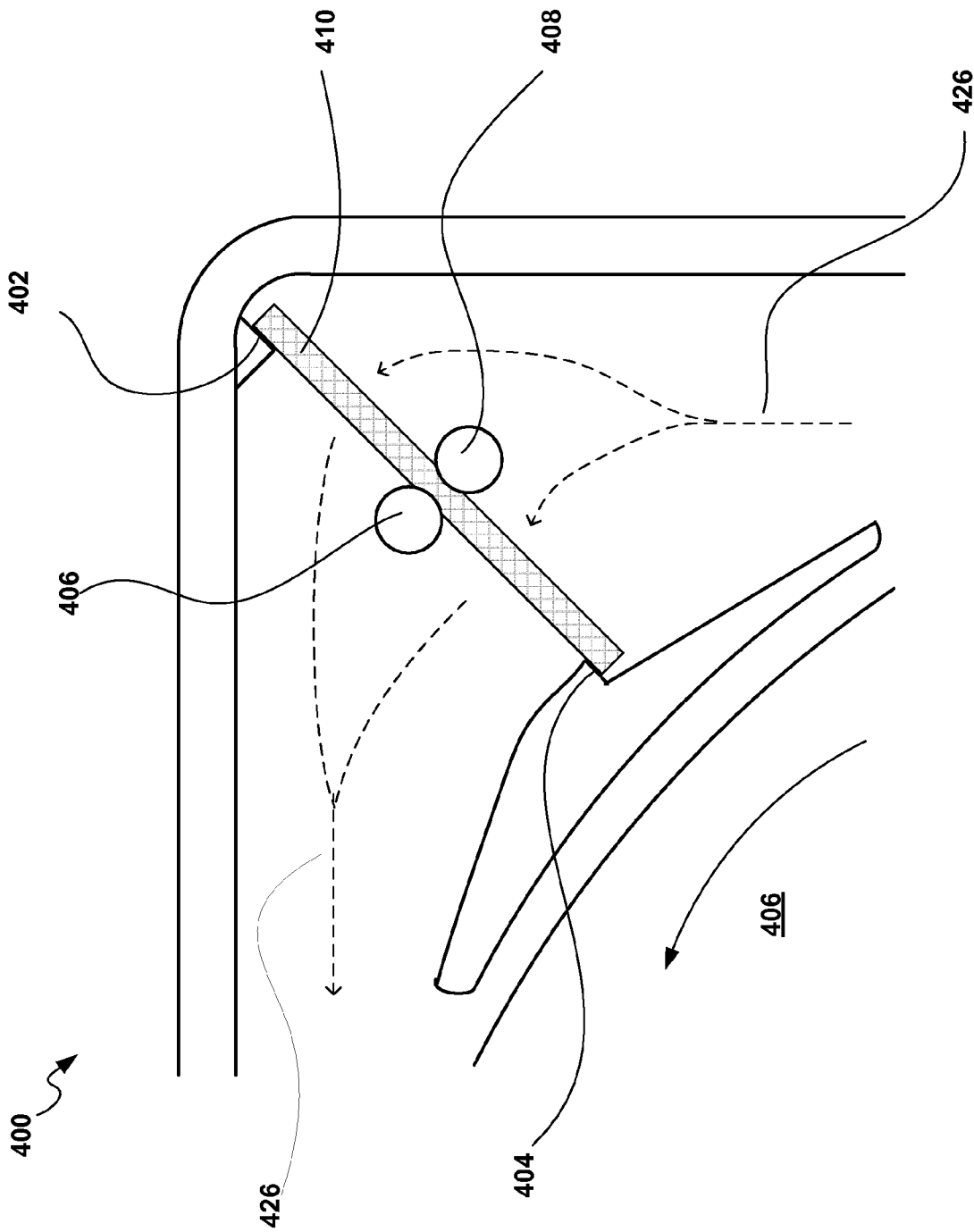
FIG. 4 is an illustration of an embodiment of a filter assembly including end supports on the downstream side of filter.

FIG. 4 is an illustration of an embodiment of a filter assembly 400 that includes end supports 402 and 404 on the downstream side of filter 410. In contrast to end support 212 of filter assembly 116 shown in FIG. 3, end supports 402 and 404 are not slots, but surfaces configured to combine with first support element 408 and second support element 406 to constrain filter 410 within filter assembly 400. Gas flow 426 is created by rotating disc 401. First support element 408 and second support element 406 combine to provide an interference fit for filter 410. End support 404 and end support 402 are fixed surfaces on the downstream side of filter surface and prevent filter 410 from flexing or bending due to forces resulting from gas flow 426.

Figure 5:
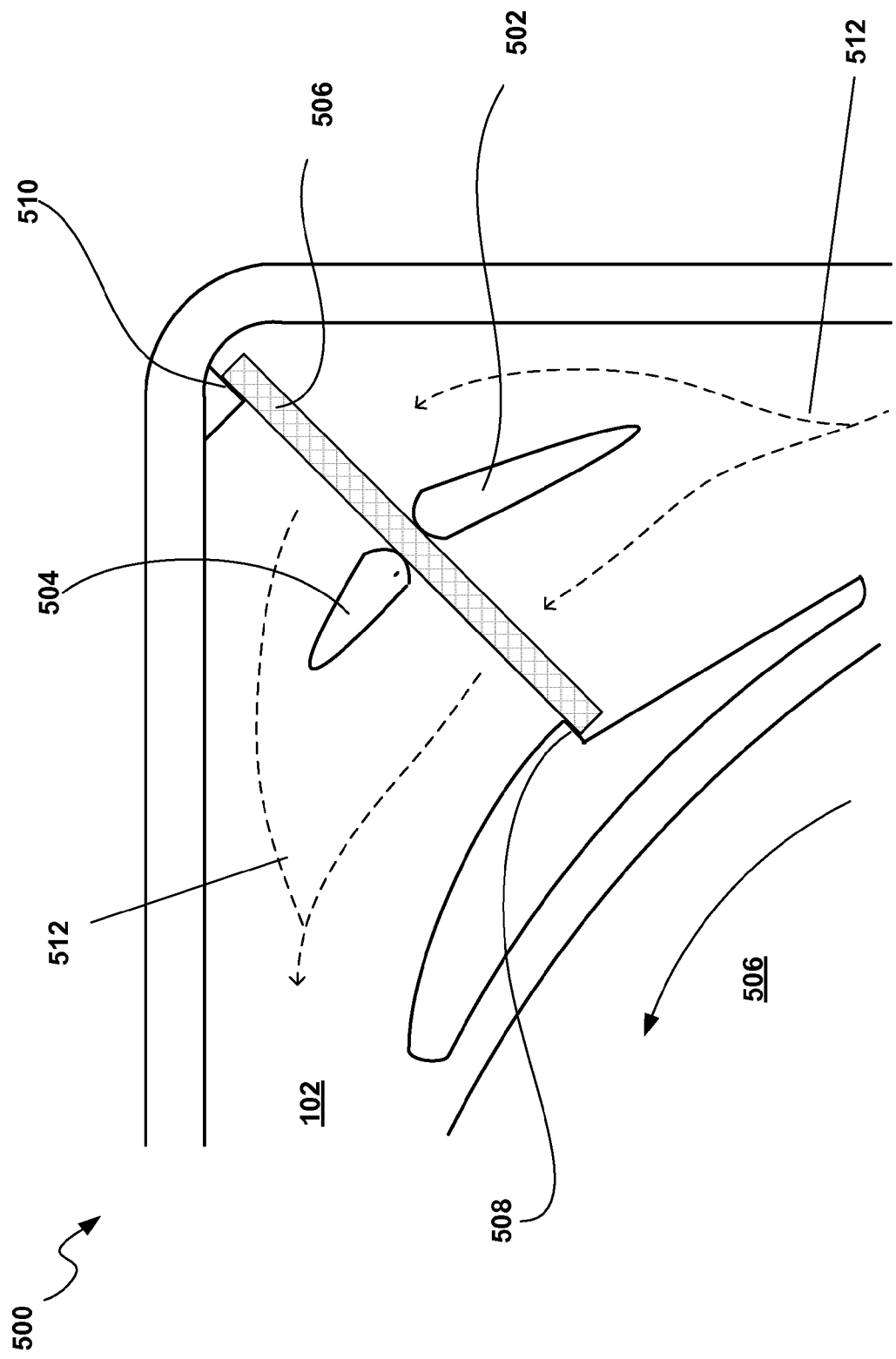
FIG. 5 is an illustration of an embodiment of a filter assembly including streamlined support elements.

As shown in FIG. 5, support element structure can be designed to manipulate gas flow across a filter. FIG. 5 is an illustration of filter assembly 500 including streamline shaped support elements 502 and 504. Filter 506 is interference fit between first support element 502 and second support element 504. End supports 508, 510 are configured as fixed surfaces adjacent to the downstream filter surface. First support element 502 has an elongated and streamlined shape. First support element 502 may separate gas flow 512 created by rotating disc 506 and may also limit the vortex and turbulence of gas flow 512 as it enters the upstream surface of filter 506. Manipulation of gas flow 512 may result in increased pressure drop across a filter. Generally, increased pressure drop will increase the efficiency of a filter assembly. As shown in FIG. 5, support elements 502 and 504 have a teardrop cross-sectional shape, in other embodiments, one or both support element may have an elliptical cross-sectional shape.

In some embodiments of the invention with at least a streamlined support element, the pressure drop across the filter may increase at least 2 percent. For example, a pressure increase may be 4 percent. For further example, a pressure increase may be approximately 7 percent. In some embodiments, pressure drop across the filter may increase from 3.2 pascal to 3.4 pascal.

Figure 6:
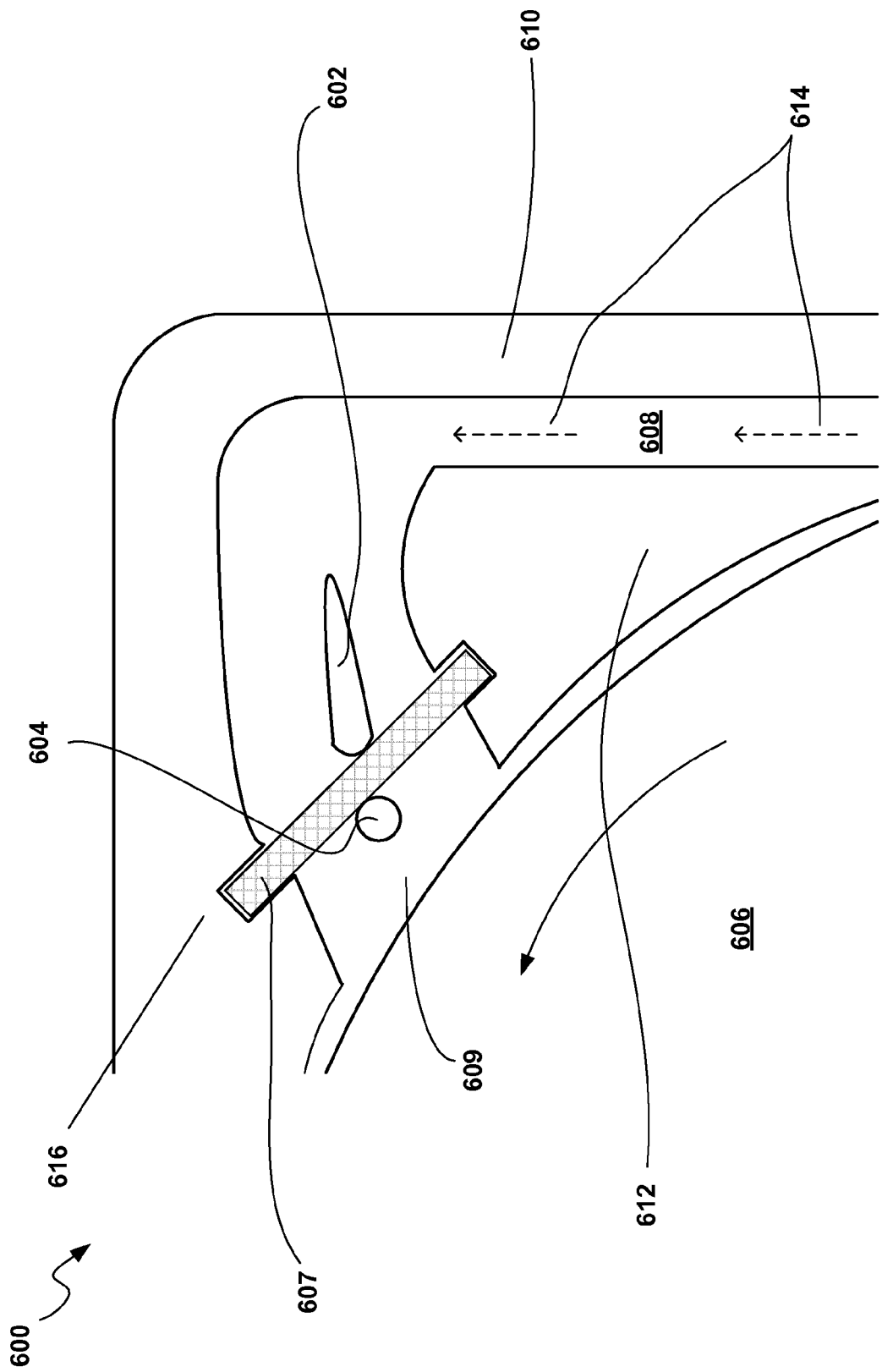
FIG. 6 is an illustration of an embodiment of a filter assembly including a gas flow channel.

FIG. 6 is an illustration of an embodiment of a filter assembly 600 including a gas flow channel 608. As shown, base wall 610 and fixed end support structure 612 define gas flow channel 608 within filter assembly 600. Gas flow 614 is diverted into gas flow channel 608. Filter 607 spans gas flow channel 608 adjacent to channel outlet 609 to capture particles from gas flow channel 608.

Filter 607 is interference fit between first support element 602 and second support element 604. As shown, first support element 602 has a teardrop cross-sectional shape while and second support element 604 has a circular cross-sectional shape. Filter 607 end portions are constrained by slots formed by end supports 612 and 616. Filter 607 is oriented to face the rotational axis of rotatable data discs 606.

A variety of filter materials may be used in the described embodiments. For example, polyethylene, polypropylene, PTFE, nylon and materials that may allow for electrostatic filtration. This list is not exhaustive and other filter materials may also be used. Generally, materials providing a porous and elastic filter may be used.

Embodiments of the invention may provide one or more advantages. For example, some embodiments may provide an increase in effective filter area without increasing the size of a recirculation filter assembly within a disc drive. Embodiments also allow for designing streamlined support elements to manipulate the gas flow entering a filter to limit drag across a recirculation filter assembly. Each of these advantages can provide an increased pressure drop across a recirculation filter, demonstrating an increase in filter efficiency.

Embodiments providing an interference fit between two support elements located near a midpoint of the filter may more securely hold a filter within a disc drive housing. An interference fit also allows simple filter installation.

Various embodiments of the invention have been described. These and other embodiments are within the scope of the following claims.

What is claimed is:

1. A device comprising:

a housing defining an internal environment;

a rotatable data disc within the housing, wherein the rotatable data disc creates a fluid flow within the housing when the rotatable data disc rotates; and a filter assembly including:

a filter, wherein the filter is positioned adjacent to an outer perimeter of the rotatable data disc in a corner of the housing and;

a first support element fixed relative to the housing and adjacent an upstream side of the filter, wherein the fluid flow circumscribes the first support element; and a second support element fixed to the housing and adjacent a downstream side of the filter, wherein the fluid flow also circumscribes the second support element, wherein the filter comprises an electrostatic filter element, wherein a cross section of the first support element has an elongated and streamlined shape.

2. The device of claim 1, wherein the first support element and the second support element secures the filter relative to the housing by an interference fit.

3. The device of claim 1, further comprising at least one additional support element that constrains an end of the filter.

4. The device of claim 1, wherein a cross section of the first support element has a teardrop shape.

5. The device of claim 1, further comprising a fluid flow channel on the upstream side the filter, wherein the filter spans the fluid flow channel.

6. An assembly comprising:

a housing;

a rotatable data disc within the housing, wherein the rotatable data disc creates a fluid flow within the housing when the rotatable data disc rotates;

a filter at a perimeter position of the rotatable data disc positioned to capture a portion of the fluid flow;

a first support element fixed relative to the housing and adjacent an upstream side of the filter, wherein the portion of the fluid flow circumscribes the first support element; and a second support element fixed to the housing and adjacent a downstream side of the filter, wherein the portion of the fluid flow also circumscribes the second support element, wherein the filter comprises an electrostatic filter element, wherein a cross section of the first support element has a teardrop shape.

7. The assembly of claim 6, wherein the filter is interference fit between the first support element and the second support element.

8. The assembly of claim 6, wherein the first support element is approximately coincident with the second support element relative to the fluid flow.

9. The assembly of claim 6, wherein the first support element and the second support element are located at the midpoint of the filter.

10. The assembly of claim 6, further comprising at least one additional support adjacent to an end of the filter.

11. The assembly of claim 6, wherein the fluid flow is an air flow.

12. The assembly of claim 6, wherein the filter comprises a filter element including plastic material.

13. The assembly of claim 12, wherein the plastic material is at least one of polypropylene plastic or polyethylene plastic.

14. The assembly of claim 6, wherein the data disc is a magnetically recordable disc.

15. The assembly of claim 6, further comprising a fluid flow channel on the upstream side the filter.

16. A method of manufacturing a disc drive comprising:

mounting a disc to a rotatable spindle motor attached to a base; wherein a first support element is fixed relative to the base at a first position adjacent to the disc; wherein a second support element is fixed relative to the base at a second position adjacent to the disc; and placing a filter between the first support element and the second support element to secure the filter to the base at the outer perimeter of the disc such that an effective filter area of the filter is divided by each of the first and the second support elements; wherein the filter is interference fit between the first support element and the second support element wherein the filter comprises an electrostatic filter element, wherein a cross section of the first support element has an elongated and streamlined shape.

17. The method of claim 16, wherein the first and second support elements are substantially equal distance from an axis of the spindle.

18. The method of claim 16, wherein the filter comprises a filter element including plastic material.

19. The method of claim 16, wherein a cross section of the first support element has a teardrop shape.

20. The method of claim 16, further comprising a fluid flow channel adjacent to the filter.

* * * * *